United States Patent Office 3,329,647
Patented July 4, 1967

3,329,647
CROSS-LINKING AGENTS
George E. Serniuk, Roselle, and John Rehner, Jr., and Peter E. Wei, Westfield, N.J., assignors to Esso Research and Engineering Company, a corporation of Delaware
No Drawing. Filed June 26, 1963, Ser. No. 290,643
10 Claims. (Cl. 260—41)

This invention relates to a polymer-containing composition of matter which may be cured, and the process for curing said composition. More specifically, it relates to a synergistic combination of agents which may be added to a polymer or copolymer to effect a cross-linking of the polymer molecules.

It is known in the art that hydrocarbon polymers such as various rubbers or thermoplastics may be vulcanized by means of sulfur and certain organic peroxides. This is especially interesting as applied to polymers which contain no unsaturation, since in the absence of other reactive groups, these materials are difficult to cross-link.

It has also been disclosed in copending application Ser. No. 247,803, filed Dec. 28, 1962, that polymers may be cured with sulfur and certain halogenated aliphatic compounds. These agents, like the peroxides, surprisingly are capable of curing saturated as well as unsaturated polymers.

By the present invention it has been found that when polymers are combined with a curing mixture which contains both organic peroxides and certain haloaliphatic compounds in specific mole ratios, then these two different kinds of curing agents synergistically coact so that their total vulcanizing effect is greater than could be predicted from the effect of each curing agent alone. Not only does the use of these dissimilar curatives, in appropriate mole ratios produce an improved vulcanizate, but also the cross-linked products have a lower odor level, and a lower degree of mold staining and corrosion than ordinarily accompanies the sole use of one or the other of these curing agents.

More specifically, it has been found that improved curing will result if the following materials are added to the polymer in the proportions indicated. All parts in this specification are by weight per 100 parts of polymer. To 100 parts of polymer containing up to 200 parts of filler is added 0.05 to 10 parts of sulfur, 0.1 to 50 parts of a metal compound, 0.1 to 80 parts of a halogenated aliphatic compound, and 0.02 to 0.7 mole of organic peroxide per mole of halogenated aliphatic compound. It is very important that the mole ratio of the peroxide to the halogenated aliphatic compound be no more than about 1/1.5 (or alternatively, about 0.7/1) to achieve a synergistic effect.

The preferred amounts of these additives are 0.5–2.0 parts of sulfur, 0.1–10.0 parts of metal compound, 20–70 parts of filler, 1.5–20.0 parts of halogenated aliphatic compound, and 0.05–0.2 mole of organic peroxide per mole of halogenated aliphatic compound. Furthermore, it is desirable to masterbatch the polymer and the curing recipe, prior to vulcanization. Finally, it has been found that the addition of a minor amount of di(trichloromethyl) sulfone results in a dual synergistic effect.

The claims of this invention are directed to compositions wherein the peroxide to halogenated aliphatic compound mole ratio is no more than about 1/1.5 since it is in this range that the synergistic effect on tensile strength occurs. However, it is to be noted that good vulcanizates are obtained with mole ratios that range up to 3/1. Thus while there is no synergistic enhancement of tensile strength at the higher ratios (and in fact there is a retarding effect at ratios above 1/1) nevertheless other properties such as hot tear strength are notably good at ratios between about 1/1 and 3/1.

The polymers to which the present invention is applicable include high unsaturation rubbers such as natural rubber, polybutadiene, nitrile rubber (a copolymer of acrylonitrile and butadiene), SBR (a copolymer of styrene and butadiene), and a polychloroprene (a homopolymer of 2-chloro-butadiene-1,3). The invention is also applicable to low unsaturation rubbers such as butyl rubber (a copolymer of a major portion of a $C_4$–$C_7$ isoolefin with a minor portion of a $C_4$–$C_{10}$ multiolefin), and chlorobutyl (chlorinated butyl rubber). Finally, and most surprisingly, elastomers and crystalline polymers with substantially no unsaturation may be cured by the agents of the present invention. These include Vistanex (polyisobutylene) and the low pressure, substantially amorphous copolymers of ethylene and other alpha olefins. The copolymers thus include $C_3$ to $C_5$ alpha olefins such as propylene, 1-butene, and 1-pentene. Propylene is particularly preferred as the other alpha olefin. The process for producing these low pressure copolymers is generally described in the literature, e.g., see U.K. Patent 856,736, "Scientific American," September 1957, pages 98 et seq., and page 6 of copending application Ser. No. 116,938, filed June 14, 1961. The invention is also applicable to amorphous or crystalline alpha olefin homopolymers, especially those produced from $C_2$–$C_5$ monomers such as polyethylene and polypropylene, to blends of various of the above listed polymers, and to copolymers containing more than two kinds of monomers, such as terpolymers and tetrapolymers. Finally it is to be noted that the use of a mineral-filled or oil-extended polymers will yield an improved product.

The organic peroxides which are useful in this invention are those peroxides which are useful generally in the curing of polymers, especially saturated polymers. These peroxides may be generally defined by the formula R—O—O—R' where R and R' are hydrocarbon alkyl, aryl, aralkyl or cycloalkyl radicals. Peroxides which are not useful in cross-linking polymers are not operative in this invention. Thus as will be shown in the data below, benzoyl peroxide is not useful. Examples of useful peroxides are ascaridol, dicumyl peroxide, and di-t-butyl peroxide. The preferred peroxides are dicumyl peroxide and di-t-butyl peroxide. These peroxides may be used singly or in mixtures of varying ratios.

The polyhaloaliphatic compounds which may be used in this invention include polyhaloalkanes, and polyhalocyclomonoalkenes and two specific perhalopolyenes. The halogen is chlorine, bromine or iodine; the preferred halogen is chlorine. By polyhaloalkanes is meant $C_1$–$C_{20}$ alkanes which have been substituted with halogen to such an extent that they contain not more than one hydrogen atom per molecule. Representative examples of these compounds include $CCl_4$, $CHCl_3$, hexachloroethane, heptachloropropane, octachloropropane, the bromine and iodine analogs of these compounds, and compounds of mixed halogenation such as dichloro-dibromomethane. Especially preferred are hexachloroethane, heptachloropropane, and octachloropropane.

The polyhalocyclomonoalkenes which may be used in this invention include cyclomonoolefins which contain between 3 and 20 ring carbon atoms and which have been substituted with halogen atoms to such an extent that they contain not more than one hydrogen atom per molecule. Especially preferred of this group is octachlorocyclopentene.

Additionally the two perhalopolyenes which are useful in this invention are bis-heptachlorocyclopentene and the Diels-Alder dimer of hexachlorocyclopentadiene.

Compounds which do not fall into the above categories are not useful in this invention. Thus, for example, among the numerous inoperative compounds are hexachlorobenzene, hexachlorocyclopentadiene, tetrabromoethylene, hexachloropropene, 1,1,2,2-tetrachloroethane, perchloroethylene, and hexachloro-1,3-butadiene.

Fillers which may be used in this invention include a variety of carbon blacks, clays, silicas, whitings, oils, resins and waxes. Best results are obtained with semi-reinforcing or highly reinforcing furnace and channel carbon blacks such as those designated commercially as SAF, SRF, HAF, EPC, and MPC types of carbon blacks. The amount of filler used can be up to 200 parts by weight, but preferably 20 to 70 parts per 100 parts of polymer are used.

The metal compounds which are useful in this invention include metals, inorganic metallic compounds, and metal salts of carboxylic acids. Preferred substances are aluminum powder, the metal halides, metal oxides, metal sulfides, metal ammonium sulfates, and the metal salts of alkyl mono- and di-carboxylic acids. Especially preferred are iron oxide (ferrous and ferric), iron chloride, aluminum chloride, iron "octasol" (iron 2-ethylhexoate) and iron di-stearate. These substances may be present in amounts of about 0.1 to 20 parts by weight, preferably 0.1 to 10 parts.

The cross-linking of the polymers may be effected by mixing the polymer with a curing mixture, e.g., on a rubber mill, or in a Banbury mixer, and subjecting the resulting mixture to temperatures of 212 to 450° F., preferably 280 to 400° F., for from 1 to 180 minutes, preferably 1 to 90 minutes.

A more preferred method is to mix the polymer and curing agents with or without sulfur or other additives into a masterbatch and mixing other desired or necessary additives with the masterbatch just prior to heating the composition to effect vulcanization. The advantages of producing the cross-linked product in this manner include the following: (1) mixing time is reduced, (2) the addition of the curing agent to the masterbatch lowers the Mooney viscosity of the mixture and thereby facilitates the processing of the polymer.

This invention and its advantages will be better understood by reference to the following examples.

*Example 1*

An ethylene-propylene copolymer was vulcanized as follows, parts in all examples are by weight.

As can be seen from the above data, the combination of the peroxide and octachlorocyclopentene in a mole ratio of about ¼ resulted in a synergistic coaction of the two in the presence of sulfur and the metal compound. When the metal compound was not present, no synergism resulted (1st three columns).

*Example 2*

The effect of other peroxides as synergistic coactants with octachlorocyclopentene (OCCP) is shown below:

| Compound | 1 | 2 | 3 | 4 | 5 |
|---|---|---|---|---|---|
| Ethylene-Propylene Rubber [1] | 100 | 100 | 100 | 100 | 100 |
| HAF Black, phr | 50 | 50 | 50 | 50 | 50 |
| $Fe_2O_3$, phr | 5 | 5 | 5 | 5 | 5 |
| Sulfur, phr | 1 | 1 | 1 | 1 | 1 |
| Octachlorocyclopentene, phr | 3.4 | 0 | 3.4 | 0 | 3.4 |
| Octachlorocyclopentene, moles | 0.00991 | 0 | 0.00991 | 0 | 0.00991 |
| Benzoyl Peroxide, phr | 1.6 | 1.6 | 0 | 0 | 0 |
| Benzoyl Peroxide, moles | 0.0066 | 0.0066 | 0 | 0 | 0 |
| Di-t-Butyl Peroxide (90%), phr | 0 | 0 | 1.1 | 1.1 | 0 |
| Di-t-Butyl Peroxide, moles | 0 | 0 | 0.0066 | 0.0066 | 0 |
| Peroxide/OCCP, mole ratio | 0.67 | | 0.67 | | |
| Vulcanizate Properties (Cure: 60'/320° F.): | | | | | |
| Modulus at 300%, p.s.i | | NC | 1,375 | 180 | |
| Tensile Strength, p.s.i | 190 | | 1,860 | 185 | 1,200 |
| Elongation, percent | 200 | | 400 | 330 | 375 |

[1] 42.5 weight percent ethylene, intrinsic viscosity in decalin at 135° C. is 2.52.

As can be seen from the data above, benzoyl peroxide, which is not a curing agent itself, did not coact with the halogenated compound (octachlorocyclopentene). The di-t-butyl peroxide, however, in a mole ratio of about 1/1.5 with the octachlorocyclopentene, did synergistically coact.

*Example 3*

The importance of the mole ratio of the peroxide to the halogenated compound in regard to its effect on tensile strength is shown in the following data.

A masterbatch was prepared containing 100 parts of the ethylene-propylene copolymer of Example 1. To this was added 50 parts of HAF Black, 5 parts of $Fe_2O_3$, and 1 part of sulfur. The amounts and identity of other additives are noted below:

| Compound | 1 | 2 | 3 | 4 | 5 | 6 |
|---|---|---|---|---|---|---|
| Ethylene Propylene Rubber [1] | 100 | 100 | 100 | 100 | 100 | 100 |
| HAF Black, phr | 50 | 50 | 50 | 50 | 50 | 50 |
| Sulfur, phr | 1 | 1 | 1 | 1 | 1 | 1 |
| $Fe_2O_3$, phr | 0 | 0 | 0 | 5 | 5 | 5 |
| Dicumyl Peroxide, phr | 0.9 | 0 | 0.9 | 0.9 | 0 | 0.9 |
| Dicumyl Peroxide, moles | 0.00333 | 0 | 0.00333 | 0.00333 | 0 | 0.00333 |
| Octachlorocyclopentene, phr | 0 | 5 | 5 | 0 | 5 | 5 |
| Octachlorocyclopentene, moles | 0 | 0.01455 | 0.01455 | 0 | 0.01455 | 0.01455 |
| Dicumyl Peroxide/Octachlorocyclopentene, mole ratio | | | 0.228 | | | 0.228 |
| Vulcanizate Properties (Cure: 40'/320° F.): | | | | | | |
| Tensile Strength, p.s.i | 350 | 90 | 185 | 340 | 750 | 2,210 |
| Elongation, percent | 820 | 150 | 730 | 975 | 340 | 440 |

[1] 42.5 weight percent ethylene, intrinsic viscosity in decalin at 135° C., 2.52.

| Compound | 1 | 2 | 3 | 4 | 5 | 6 |
|---|---|---|---|---|---|---|
| Dicumyl peroxide, phr | 2.7 | | 2.7 | 1.8 | | 1.8 |
| Dicumyl peroxide, moles | 0.01 | | 0.01 | 0.00666 | | 0.00666 |
| Octachlorocyclopentene, phr | | 1.67 | 1.67 | | 3.34 | 3.34 |
| Octachlorocyclopentene, moles | | 0.00486 | 0.00486 | | 0.00972 | 0.00972 |
| Peroxide/OCCP, mole ratio | | | 2.06 | | | 0.685 |
| Vulcanizate Properties (Cure: 40'/320° F.): | | | | | | |
| Tensile Strength, p.s.i | 2,770 | 120 | 2,540 | 1,890 | 235 | 2,460 |
| Elongation, Percent | 660 | 200 | 675 | 800 | 275 | 560 |

The data above show that when the mole ratio of peroxide to halogenated compound is about 1/0.486 there is no synergistic effect with respect to tensile strength. In fact, there appears to be a retarding effect. However, when the mole ratio of peroxide to halogenated compound is about 1/1.5 there is a small synergistic effect.

Example 4

Dicumyl peroxide was combined with the dimer of hexachlorocyclopentadiene in mole ratios of about 1/5 and 1/7.4 to demonstrate their synergistic coaction. The compounds below were added to a masterbatch prepared as in Example 3. Further details and results were as follows:

| Compound | 1 | 2 | 3 | 4 | 5 |
|---|---|---|---|---|---|
| Dimer, phr | 5 | 5 | 0 | 7.5 | 7.5 |
| Dimer, moles | 0.00915 | 0.00915 | 0 | 0.01373 | 0.01373 |
| Dicumyl Peroxide, phr | 0 | 0.5 | 0.5 | 0 | 0.5 |
| Dicumyl Peroxide, moles | 0 | 0.00185 | 0.00185 | 0 | 0.00185 |
| Peroxide/Dimer, mole ratio | 0 | 0.202 | | | 0.1345 |
| Vulcanization Properties: | | | | | |
| Cure: 20'/320° F.— | | | | | |
| Tensile Strength, p.s.i. | 250 | 1,985 | 110 | 480 | 1,980 |
| Elongation, Percent | 325 | 665 | 240 | 290 | 540 |
| Cure: 40'/320° F.— | | | | | |
| Tensile Strength, p.s.i. | 520 | 2,290 | 110 | 890 | 2,030 |
| Elongation, Percent | 300 | 610 | 330 | 275 | 450 |
| Cure: 60'/320° F.— | | | | | |
| Tensile Strength, p.s.i. | 550 | 2,600 | 100 | 1,020 | 2,090 |
| Elongation, Percent | 310 | 570 | 190 | 290 | 420 |

Example 5

Dicumyl peroxide was combined with bis (heptachlorocyclopentene),B(HCCP), in mole ratios of 1/4.4, 1/7.85 and 1/11.8 to demonstrate their synergistic coaction. The compounds below were added to a masterbatch prepared as in Example 3. Details and results were as follows:

| Compound | 1 | 2 | 3 | 4 | 5 |
|---|---|---|---|---|---|
| Octachlorocyclopentene, phr | 4.5 | | 4.5 | 4.5 | |
| Di(Trichloromethyl) Sulfone, phr | | 0.5 | 0.5 | 0.5 | |
| Dicumyl Peroxide, phr | | | | 0.5 | 0.5 |
| Dicumyl Peroxide/Halogen Compounds, mole ratio | | | | 0.1252 | |
| Vulcanizate Properties: | | | | | |
| Cure: 20'/320° F.— | | | | | |
| Tensile Strength, p.s.i. | NC | 85 | NC | 1,120 | 110 |
| Elongation, percent | | 300 | | 560 | 240 |
| Cure: 40'/320° F.— | | | | | |
| Tensile Strength, p.s.i. | 315 | 110 | 2,070 | 2,510 | 110 |
| Elongation, percent | 310 | 200 | 410 | 390 | 330 |
| Cure: 60'/320° F.— | | | | | |
| Tensile Strength, p.s.i. | 1,700 | 90 | 2,460 | 2,770 | 100 |
| Elongation, percent | 375 | 325 | 350 | 380 | 190 |

NC=No cure.

The advantages of this invention will be obvious to those skilled in the art. A new and more economical system has been provided for cross-linking polymers, especially saturated polymers. Furthermore, this system has a low order level (as compared with peroxides) and a minimal amount of mold staining results.

This invention has been described in connection with certain specific embodiments thereof; however, it should be understood that these are by way of example rather than by way of limitation and it is not intended that the invention be restricted thereby.

What is claimed is:

1. A curable composition of matter comprising 0.5 to 10 parts of sulfur, a filler, a polymer selected from homopolymers and copolymers of $C_2$-$C_5$ alpha olefins, and in synergistic combination therewith, 0.1 to 20 parts of a metal compound selected from the class consisting of iron oxide, iron chloride, iron 2-ethyl hexoate and iron distearate; along with
    (a) an organic peroxide which is useful as a curing agent, selected from the class consisting of dicumyl and di-t-butyl peroxide and
    (b) 0.1 to 80 parts of a polyhalogenated compound containing no more than one hydrogen atom wherein the halogen is chlorine, said compound being selected from the class consisting of:
        (1) $C_1$-$C_{20}$ polyhaloalkanes,

| Compound | 1 | 2 | 3 | 4 | 5 | 6 | 7 |
|---|---|---|---|---|---|---|---|
| Bis (heptachloro-cyclopentene), phr | 5 | 5 | 0 | 9 | 9 | 13.5 | 13.5 |
| Bis (heptachloro-cyclopentene), moles | 0.0081 | 0.0081 | | 0.0146 | 0.0146 | 0.0219 | 0.0219 |
| Dicumyl Peroxide, phr | 0 | 0.5 | 0.5 | 0 | 0.5 | 0 | 0.5 |
| Dicumyl Peroxide, moles | | 0.00185 | 0.00185 | | 0.00185 | | 0.00185 |
| Peroxide/B (HCCP), mole ratio | | 0.228 | | | 0.127 | | 0.0845 |
| Vulcanizate Properties: | | | | | | | |
| Cure: 20'/320° F.— | | | | | | | |
| Tensile Strength, p.s.i. | 55 | 2,640 | 110 | 80 | 2,620 | 340 | 2,185 |
| Elongation, percent | 150 | 450 | 240 | 150 | 370 | 210 | 280 |
| Cure: 40'/320° F.— | | | | | | | |
| Tensile Strength, p.s.i. | 1,435 | 2,950 | 110 | 2,150 | 2,700 | 1,765 | 1,880 |
| Elongation, percent | 330 | 425 | 330 | 210 | 275 | 120 | 175 |
| Cure: 60'/320° F.— | | | | | | | |
| Tensile Strength, p.s.i. | 2,000 | 3,170 | 100 | 1,950 | 2,265 | 1,255 | 1,630 |
| Elongation, percent | 290 | 410 | 190 | 175 | 230 | 90 | 170 |

Example 6

In the following experiment, di(trichloromethyl) sulfone was combined with octachlorocyclopentene and as is shown below a synergistic effect was observed. Then in a separate mixture a minor amount of dicumyl peroxide was added to the system in a mole ratio of about 1/8 and a double synergistic effect was observed. The masterbatch of Example 3 was again used with the additional agents added as shown.

(2) polyhalocyclomonoalkenes containing from 3 to 20 ring carbon atoms, (3) the Diels-Alder dimer of hexachlorocyclopentadiene, and (4) bis(heptachlorocyclopentene);

wherein the mole ratio of peroxide to halogenated compound is .02 to 0.7.

2. The composition of claim 1 wherein the metal compound is $Fe_2O_3$.

3. The composition of claim 2 wherein the polymer is an ethylene-propylene copolymer.

4. The composition of claim 3 wherein the polyhalogenated compound is bis(heptachlorocyclopentene).

5. The composition of claim 3 wherein the polyhalogenated compound is the Diels-Alder dimer of hexachlorocyclopentadiene.

6. The composition of claim 3 wherein the polyhalogenated compound is octachlorocyclopentene.

7. The composition of claim 6 wherein 20 to 70 parts of fillers are used and 5 parts of $Fe_2O_3$ are used per 100 parts of polymer.

8. The composition of claim 7 which additionally contains a minor amount of di(trichloromethyl) sulfone.

9. A process of curing a polymer selected from homopolymers and copolymers of $C_2$–$C_5$ alpha olefins which comprises mixing said polymer with a filler, 0.5 to 10 parts of sulfur, and in synergistic combination therewith, 0.1 to 20 parts of a metal compound selected from iron oxide, iron chloride, iron 2-ethyl hexoate and iron distearate; along with (a) an organic peroxide which is useful as a curing agent, selected from the class consisting of dicumyl peroxide and di-t-butyl peroxide and (b) 0.1 to 80 parts of a polyhalogenated compound containing no more than one hydrogen atom wherein the halogen is chlorine, said compound being selected from the class consisting of:

(1) $C_1$–$C_{20}$ polyhaloalkanes,
  (2) polyhalocyclomonoalkenes containing from 3 to 20 ring carbon atoms,
  (3) the Diels-Alder dimer of hexachlorocyclopentadiene, and
  (4) bis(heptachlorocyclopentene);

wherein the mole ratio of peroxide to halogenated compound is .02 to 0.7, and heating to a curing temperature.

10. The process of claim 9 wherein di-t-butyl peroxide, and the polyhalogenated compound is octachlorocyclopentene.

No references cited.

MORRIS LIEBMAN, *Primary Examiner.*

J. S. WALDRON, S. L. FOX, *Assistant Examiners.*